Nov. 17, 1942.  G. CATTANEO  2,301,930
MULTIPLE MOTOR DRIVE MECHANISM
Filed Feb. 23, 1940  2 Sheets-Sheet 1
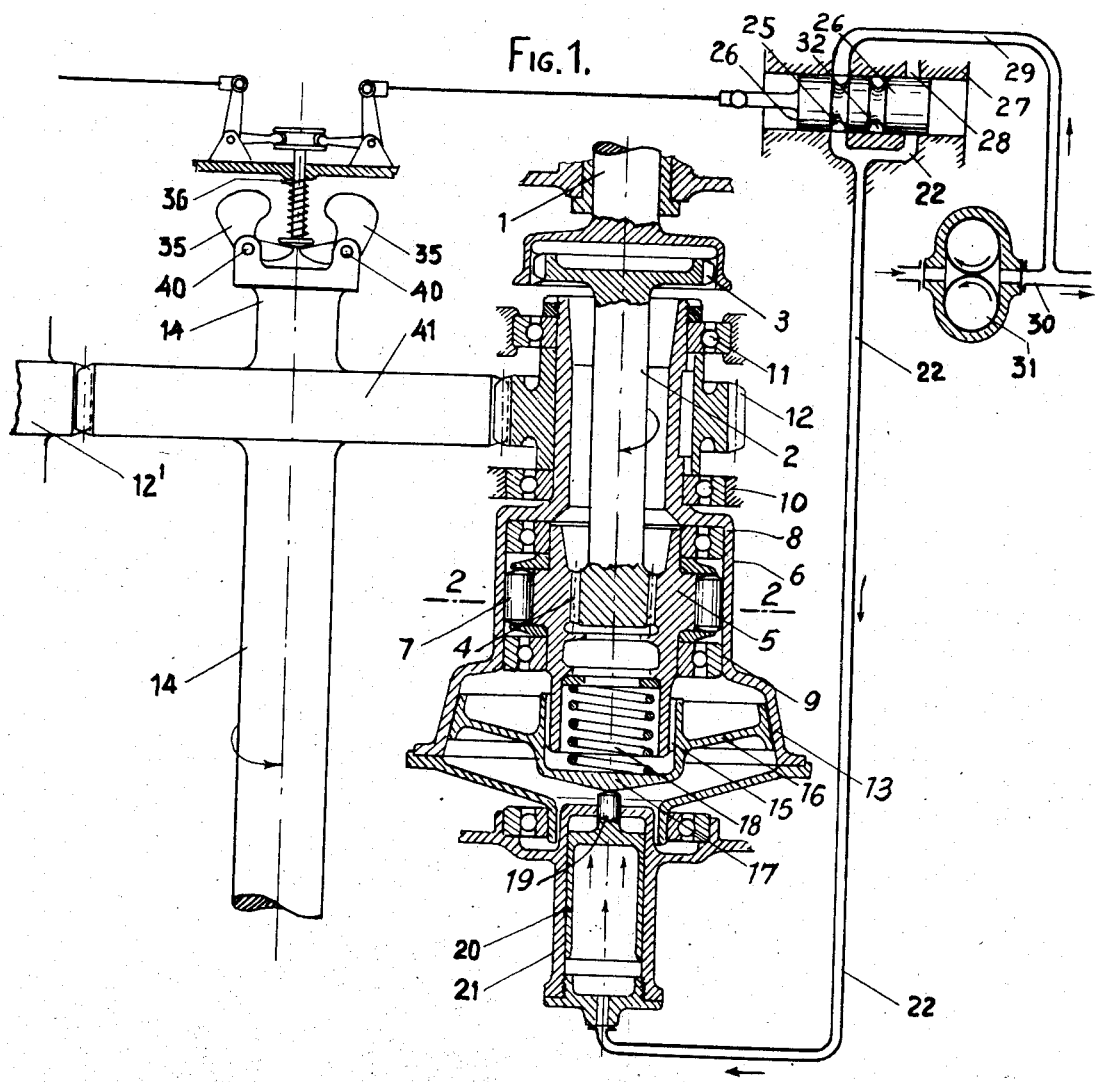
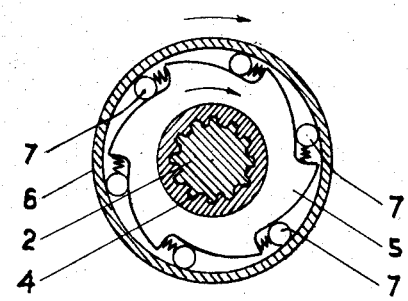
Inventor
G. Cattaneo
By: Glascock Downing & Seebold
Attys.

Nov. 17, 1942.  G. CATTANEO  2,301,930
MULTIPLE MOTOR DRIVE MECHANISM
Filed Feb. 23, 1940  2 Sheets-Sheet 2

Inventor,
G. Cattaneo

Patented Nov. 17, 1942

2,301,930

UNITED STATES PATENT OFFICE 2,301,930

MULTIPLE MOTOR DRIVE MECHANISM

Giustino Cattaneo, Milan, Italy; vested in the Alien Property Custodian

Application February 23, 1940, Serial No. 320,520
In Italy March 14, 1939

4 Claims. (Cl. 74—389)

In the engine-driven mechanical propulsion of any self-propelling machine, such as airplanes, motor-boats, automobiles etc. it may be required, for special emergencies in operation, to subdivide the source of power into a number of units, independent from each other, each transmitting its own energy to a single shaft driving the propelling member. In other words and taking as example an airplane, it may be convenient to adopt a plurality of engines, which, though independent in their operation, are transmitting each, by itself, their motion to a single shaft driving the propeller.

Against the advantages offered by such an arrangement stands in contrast the serious disadvantage that when any engine unit gets out of order and is compelled to stop, all other units connected to the same single transmission shaft, have to stop and all energy of propulsion comes to stall.

Even when the coupling of each engine unit to the single transmission shaft is obtained through a friction clutch, which, on disconnecting, puts out of commission the damaged engine, the damage may be so serious and sudden as not to give time to operate the disconnection and this may cause serious trouble and damage to all the other units. It should be also remembered that a high duty friction-clutch negotiating very great powers is always a very cumbersome and heavy member of the propelling mechanism.

The device forming the object of the present patent application, illustrated diagrammatically in Figs. 1, 2, 3, and 4 has the purpose of avoiding the above stated disadvantages retaining fully the advantages of several motive units driving each for itself a single driving shaft. In the drawings:

Fig. 1 is a longitudinal section of a device designed as an example of embodiments of the invention;

Fig. 2 is a cross-section along line A—B in Fig. 1;

Figure 3:
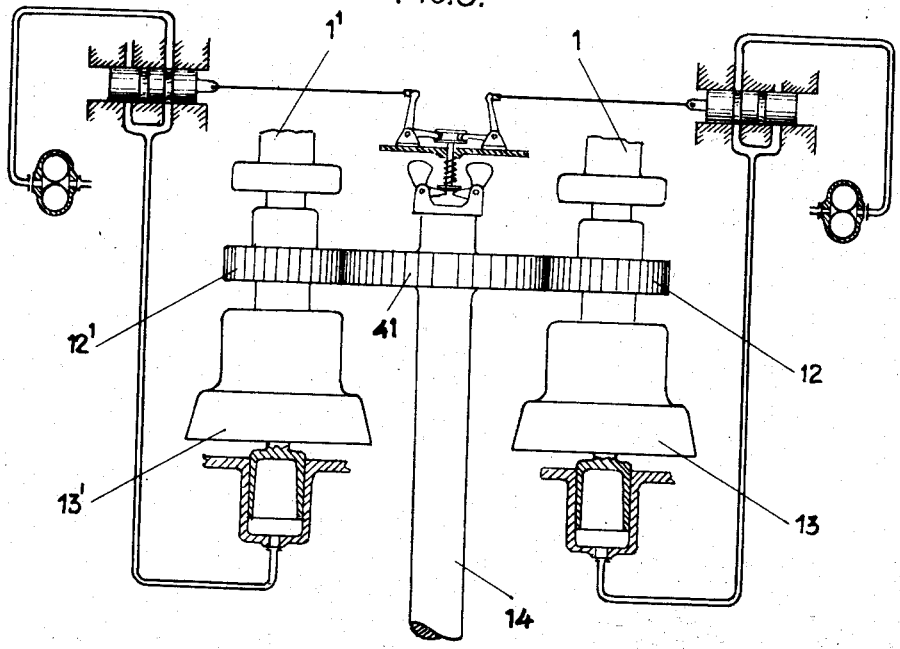
Fig. 3 is a view in smaller scale of the controls transmitting from the engine shafts to the single transmission shaft.
Figure 4:
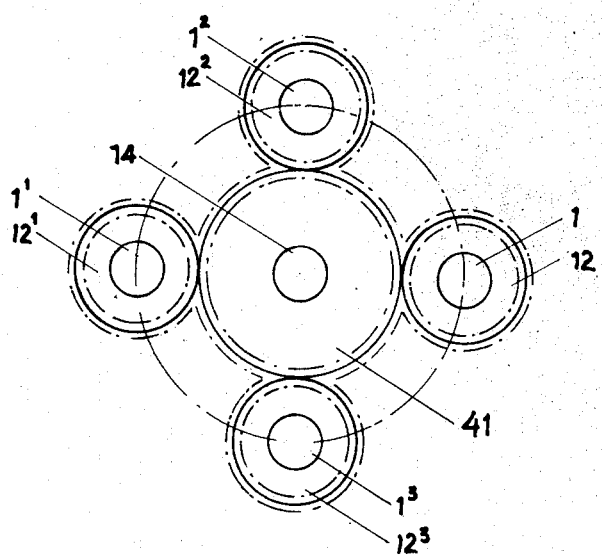
Fig. 4 is a plan view of the same.

Shaft 1, of one of the two or more engines driving the single transmission shaft 14, through the flexible toothed slip-joint 3 and 4 applied to both ends of the intermediate shaft 2, drives the hub 5, forming the male element of a free-wheel clutch (Fig. 2) centered by ball races within the outer hub 6 and forming in its turn the shroud or driven female element of said free-wheel clutch.

The clutching rollers 7 are lodged in cavities between elements 5 and 6. On hub 6, supported on the two bearings 10, 11, is keyed a pinion 12 meshing with gear-wheel 41, fixed on transmission shaft 14.

The shaft of engine 1 transmits therefore its motion to shaft 14 by the means of the free-wheel clutch 5, 6 and subsequently through the pair of gears 12, 41.

The same may be repeated for all the other engine shafts $1^1$, $1^2$, etc., which have in common the gear wheel 41.

Due to the particular function of the free-wheel clutch, the motion of the respective motors can be transmitted to shaft 14 only in one direction of rotation, namely in the direction in which each motor transmits its power, the sole direction whereby the inclined planes of hub 5 force their respective rollers against the inner cylindrical part of hub 6. If therefore any of the two or more engines do slacken in motive power until it stops, shaft 14, driven by the other units, will go on rotating in absolute independence relatively to the shaft of the damaged engine. This happens precisely due to the differential reduced motion of hub 5 relatively to hub 6, which reduced motion compels the rollers 7 to disengage, leaving the two hubs free from each other.

In other words the application of the intermediate free-wheel clutch, obtains the complete and perfect disengagement of each motive-unit from the single driven shaft each time one of the units slackens down or stops.

Should several units stop, said single shaft will go on transmitting the power delivered by the remaining units performing, without affecting in any way its regular running.

When however all the units and therefore also the single transmission shaft should be running at slow-speed, namely disengaged, the above specified free-wheel means might give some trouble, particularly in a motor-propulsive group for air-craft as the one under consideration, due to the fact that the petrol engines are entirely deprived of fly-wheel masses, so that their operation at slow-speed and running light may not always be quite regular. In fact, whilst the slow-speed of the crank-shaft of each unit, due to the above stated fact, may be subjected to frequent and sudden accelerations or decelerations, the slow-speed of the driven transmission shaft, due to the fly-wheel effect of the propeller, has the tendency to keep running regularly and constantly. It is precisely this lack of synchronism at slow-speed aft and fore of the free-wheel that may expose to risk the resistance of the latter, besides causing jerks and abnormal vibrations in the whole motor-propulsive apparatus.

A special device for a subsidiary engagement provides means for avoiding this disadvantage; it is formed of a disk 16 whose hub is torsionally connected to hub 5 of the free-wheel by means of the toothed slip-joint 15, which can slide longitudinally. The periphery of said disk 16 assumes the shape of a conical ring and matches with the female cone 13, solid with the shroud 6 or outer hub of the free-wheel.

On clutching-in cone 16 within cone 13, the free-wheel is neutralized, the crank-shaft of engine 1 being connected directly with its respective pinion 12 and therefore to the transmitting shaft 41.

In slow-speed operation of the whole motor-propulsive group, the subsidiary clutch 13—16 works under a pressure set up in the inside of cylinder 21 which, on acting on piston 20, sliding in said cylinder, pushes the piston with its rod 19 against the hub 17 of disk 16 applying the cone of the same against the female cone 13.

At the end of shaft 14, directly or indirectly connected, is a centrifugal governor—with oscillating masses 35, which through any known mechanism, controls on every motive-unit a small piston 26, guided in the cylinder 27 and provided of two channels 25 and 32.

When the shaft 14 revolves at slow speed, the governor 35 is kept closed by a spring 36 and channel 25 comes into the position shown in the drawings, putting conduit 29 in communication with channel 29 and with the inside of cylinder 21. When, on the contrary, shaft 14 speeds-up for passing to a given number of revolutions, the governor 35 opens-out against the action of the said spring and piston 26 with its channel 32 puts conduit 22 in communication with conduit 28, viz. with the outside, whilst channel 25 remains closed, intercepting the communication between conduit 22 and conduit 29. This latter 29 communicates with the delivery line 30 of a pump 31, for instance a gear-pump, driven by its respective engine 1, and which can be the same pump providing the forced lubrication of the engine.

During the operation of unit 1, there is therefore, in conduit 29, oil under pressure which, when the governor 35 is closed, namely when shaft 14 runs at slow-speed, passes from canal 25 to conduit 22 and from this against piston 20, which, overcoming the action of spring 18, compels the cone of disc 16 to clutch-in with cone 13 under a given pressure.

Thus, when shaft 14 revolves at slow-speed, shaft 1 and pinion 12 are connected, not only by the free-wheel but also directly by this subsidiary clutch whose proportions will be calculated so as to prevent, at slow-speed, any possible jerk between the two elements forming the free-wheel clutch. As soon as shaft 14 speeds up and the speed rises above a certain limit, the governor opens and the subsidiary clutch disengages leaving to the free-wheel clutch its full functions.

Should any motive-unit come to a stop, the subsidiary clutch remains disengaged, there being no oil pressure for closing it.

The device specified having to operate exclusively when the engine runs slow and being used only for covering the small and instantaneous variations of speed between the engine and the single driven shaft, requires only very small propulsions such as would not cause a substantial increase in weight and in overall dimensions.

The servo-control of the subsidiary clutch may be achieved by using either the pressure of the oil circulating in the engine or that provided by a separate oil-pump, or else by a water-pump using the water for the cooling of the engine, or else also by using the depression existing in the inlet feeding pipe of the engine when the same operates at minimum speed or finally by any mechanical action provided by the engine during its performance.

The subsidiary clutch may be made with conical surfaces, as specified above, or with discs or be of any other type. It can also be formed by front-teeth, or peripheral male and female teeth, without varying thereby its function.

Having now particularly described and ascertained the nature of my said invention and in what manner the same is to be performed, I declare that what I claim is:

1. A drive mechanism for aircraft or the like, comprising a driven propeller shaft, a plurality of drive shafts, means including an overrunning clutch associated with each drive shaft and connecting the latter to the propeller shaft, an auxiliary clutch associated with each drive shaft for locking the drive and driven shafts in direct drive, fluid actuated means controlling the auxiliary clutches, and means responsive to the speed of the propeller shaft for controlling said fluid actuated means.

2. A drive mechanism for aircraft or the like, comprising a driven propeller shaft, a plurality of drive shafts, means including an overrunning clutch associated with each drive shaft and connecting the latter to the propeller shaft, an auxiliary clutch associated with each drive shaft for locking the drive and driven shafts in direct drive, and fluid actuated means responsive to the speed of the propeller shaft for controlling said auxiliary clutches.

3. A drive mechanism for aircraft or the like, comprising a driven propeller shaft, a plurality of drive shafts, means including an overrunning clutch associated with each drive shaft and connecting the latter to the propeller shaft, an auxiliary clutch associated with each drive shaft for locking the drive and driven shafts in direct drive, fluid actuated means including a piston for each auxiliary clutch for controlling the auxiliary clutches, and means including a governor mounted on the propeller shaft and responsive to the speed of the latter for controlling the actuation of said piston.

4. A drive mechanism for aircraft or the like, comprising a driven propeller shaft, a plurality of drive shafts, means including an overrunning clutch associated with each drive shaft and connecting the latter to the propeller shaft, an auxiliary clutch associated with each drive shaft for locking the driven and drive shafts in direct drive, a source of pressure fluid, a piston for controlling the operation of said auxiliary clutches under the influence of said pressure fluid, a valve controlling the flow of said fluid to said piston, and means responsive to the speed of the propeller shaft for controlling the actuation of said valve.

GIUSTINO CATTANEO.